United States Patent

Brown

Patent Number: 5,619,846
Date of Patent: Apr. 15, 1997

[54] LAWN MOWER BLADE

[76] Inventor: Danny J. Brown, R.R. #2, Ilderton, Ontario, Canada, N0M 2A0

[21] Appl. No.: 441,422

[22] Filed: May 15, 1995

[30] Foreign Application Priority Data

Mar. 27, 1995 [CA] Canada .................. 2145557

[51] Int. Cl.⁶ .................................. A01D 34/73
[52] U.S. Cl. .......................... 56/255; 56/295
[58] Field of Search .............. 56/17.5, 295, 255, 56/DIG. 17, DIG. 20

[56] References Cited

U.S. PATENT DOCUMENTS

| 3,998,037 | 12/1976 | Deans et al. | 56/295 |
| 4,351,144 | 9/1982 | Benenati | 56/295 |
| 5,199,251 | 4/1993 | Raise et al. | 56/255 |
| 5,259,176 | 11/1993 | Kahamura et al. | 56/255 |
| 5,321,940 | 6/1994 | Peterson | 56/255 |

Primary Examiner—Terry Lee Melius
Assistant Examiner—Heather Shackelford

[57] ABSTRACT

A lawn mower blade, particularly suited for a rotary lawn mower is provided with at least two end tines at opposite ends. Each tine has a forward bevelled cutting surface. The rear most and lowest most end tines are in a common (lowest) plane while all other tines are respectively forward thereof and in planes above the common plane. There are preferably three tines at each end which, on rotation, trace out a grass cutting annulus. The tines rotate in this annulus, chopping up the grass cuttings into small pieces virtually consuming them. The cut grass clippings thus not accumulated to the underside of the lawn mower deck and then fall as clumps to leave an unsightly mess on the ground.

7 Claims, 4 Drawing Sheets

LAWN MOWER BLADE

This invention relates to a lawn mower blade. This invention relates particularly to a modified lawn mower blade for a rotary mower.

BACKGROUND TO THE INVENTION

With greater attention being given to lawn care the increased use of a rotary mower, either the push type or riding mowers has been impressive over the last twenty-five or thirty years in North America.

Existing rotary blades are composed of a flat piece of steel whose opposite ends are slightly turned and whose leading edge near each end is a bevel to the blade which acts as a cutting element to the grass. The blade rotates by being removably attached as by bolts to the rotary shaft of a two or four cycle engine. When the grass is long, a great amount of grass is ejected from the side-shoot, clutters the ground with grass clippings making the cut grass unesthetically looking. It generally is raked or bagged in order to improve appearance.

Recently mulching mowers have been invented which have single curves or double curves in parallel with deflectors or kickers and some mulching mowers have closed decks so as to attempt to hold the grass in suspension while the blade rotates so as to cut the grass into fine particles and hence mulch it.

THE INVENTION

It is an object of the invention to provide a mulching blade which mulches grass in a synchronized fashion; that is also a retro-fit for most existing lawn mowers whether gas, electric or self-propelled, provides mulching without the need for blocking the outlet shoot of the lawn mower and to increase the amount of "cuts" by the blade impacting on the grass by at least two-fold.

A lawn mower blade, particularly suited for a rotary lawn mower is provided with at least two end tines at opposite ends. Each tine has a forward bevelled cutting surface. The rear most and lowest most end tines are in a common (lowest) plane while all Other tines are respectively forward thereof and in planes above the common plane. There are preferably three tines at each end which, on rotation, trace out a grass cutting annulus. The tines rotate in this annulus, chopping up the grass cuttings into small pieces virtually consuming them. The cut grass clippings thus not accumulated to the underside of the lawn mower deck and then fall as clumps to leave an unsightly mess on the ground.

It is a further object of the invention to provide a pulverization annular cutting zone where grass clippings are cut very fine and in fact, eliminate the circumferential collection of grass cut clippings to the underskirt of a lawn mower deck which is common in the prior art, and which periodically fall during cutting onto the cut grass leaving unsightly clumps of cut clippings which either have to be disposed of by cutting the grass again, or alternatively, raking them up.

The invention, in its broadest aspect, contemplates a lawn mower cutting blade for rotary lawn mower, having a primer mover with a rotary shaft, the blade comprising an elongated member defining means for attachment of the blade to the rotary shaft of the prime mover, the blade having at opposite ends, at least two spatially disposed rearmost tines, each tine having a bevelled leading edge that acts as a cutting element against grass to be cut, during rotation by the prime mover, the rearmost tines at each end being coincident and in a lowest elevational plane, a forward tine at either end being at an elevation and in a plane above that of the lowest plane. Preferably, the forward tines are in a plane different from each other and at a higher elevation than the rearmost tines.

Also contemplated is a pair of leading tines in advance of each opposite ended, most forward tine, preferably located at an elevation wherein the leading tine at one end is at an elevation intermediate the leading and forward tine at the opposite end and further, that each of the leading and forward tines are at different elevations relative to the rearmost co-planar tines. Additionally, each of the tines should have its end bevelled to provide a second cutting element.

BRIEF DESCRIPTION OF THE INVENTION

The invention will now be described by way of example and reference to the accompanying drawings.

Figure 7A:
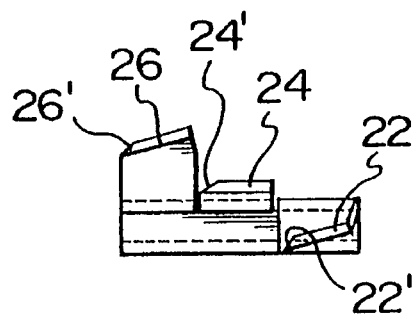
Figure 7B:
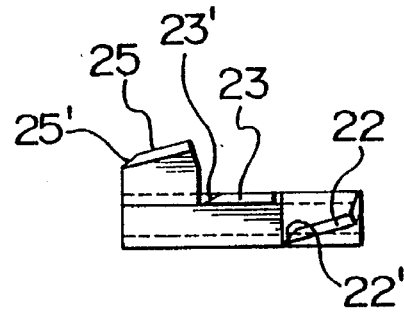

FIGS. 7A and 7B respectively are opposite end elevational views of the blade ends.

Figure 1:
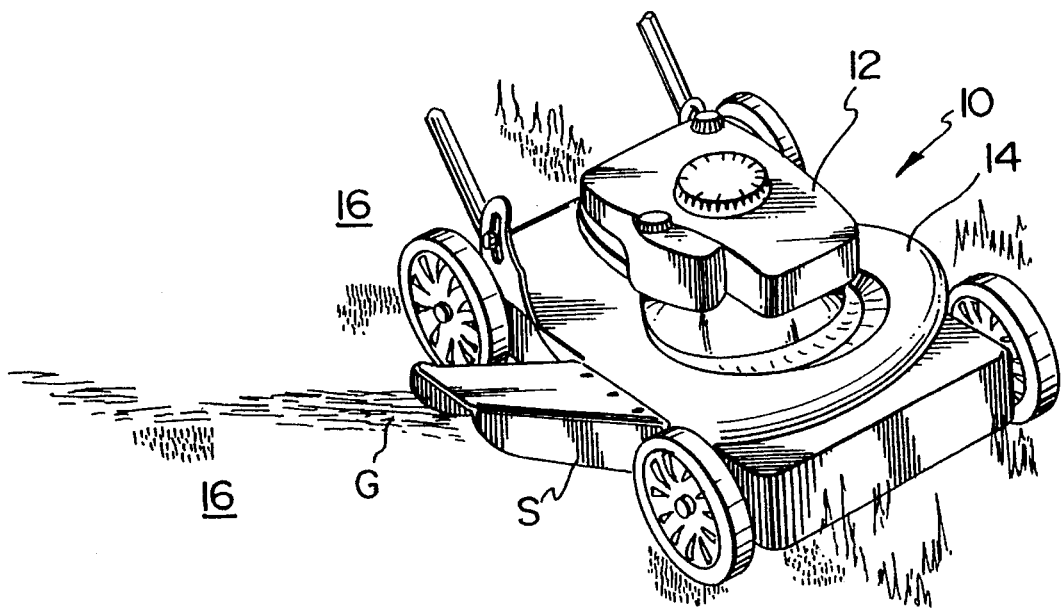
FIG. 1 is a perspective view of a lawn mower according to the prior art and FIG. 1A is a lawn mower blade of the prior art used with the lawn mower of FIG. 1.

According to the prior art, a lawn mower (10) is shown with a gas engine (12) mounted on the top thereof, the shaft, extending vertically downward through the lawn mower deck (14). To this rotary shaft, according to this prior art is a lawn mower blade (15) removably bolted and as those skilled in the art will know. When the lawn mower (10) is operated along a cutting sequence as shown in FIG. 1, cut grass (G) is ejected from a shoot (S) as a grass stream (G) to settle and to rest on the cut grass portion (16) yielding an unsightly mess commonly seen when long grass is cut after the grass has been allowed to grow too long.

Figure 2:
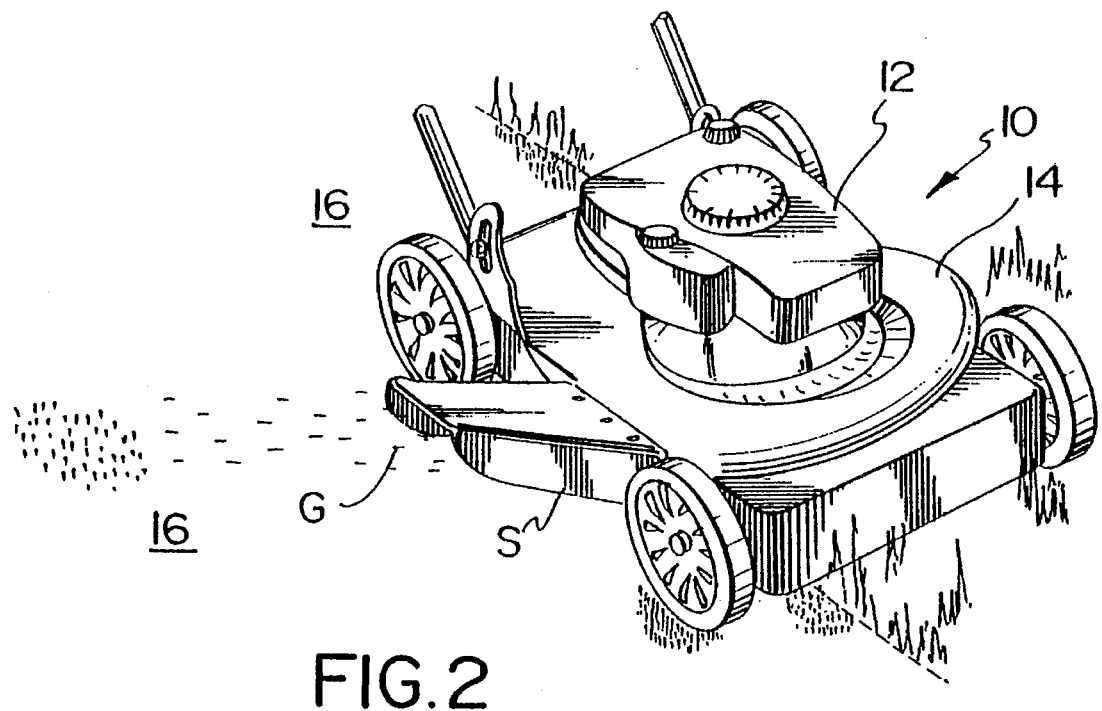
FIG. 2 is a perspective view of the cutting operation of the lawn mower of FIG. 1 but incorporating the novel blade of this invention.
Figure 2A:
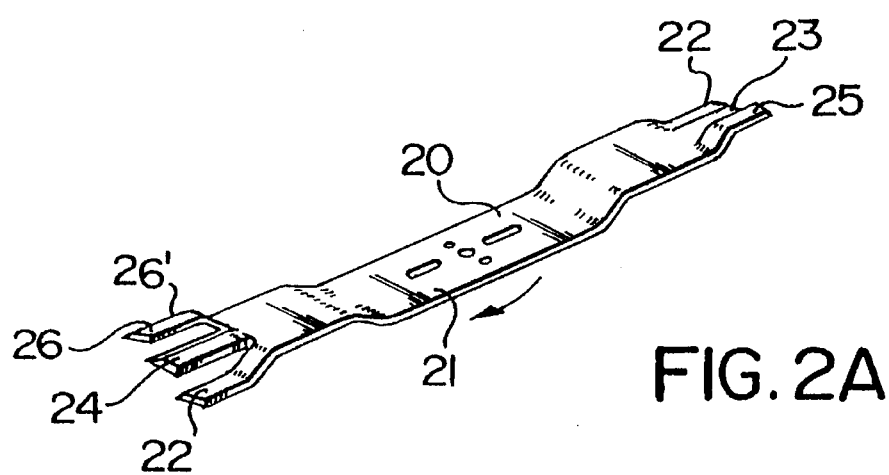
FIG. 2A is a perspective view of my novel blade.
Figure 3:
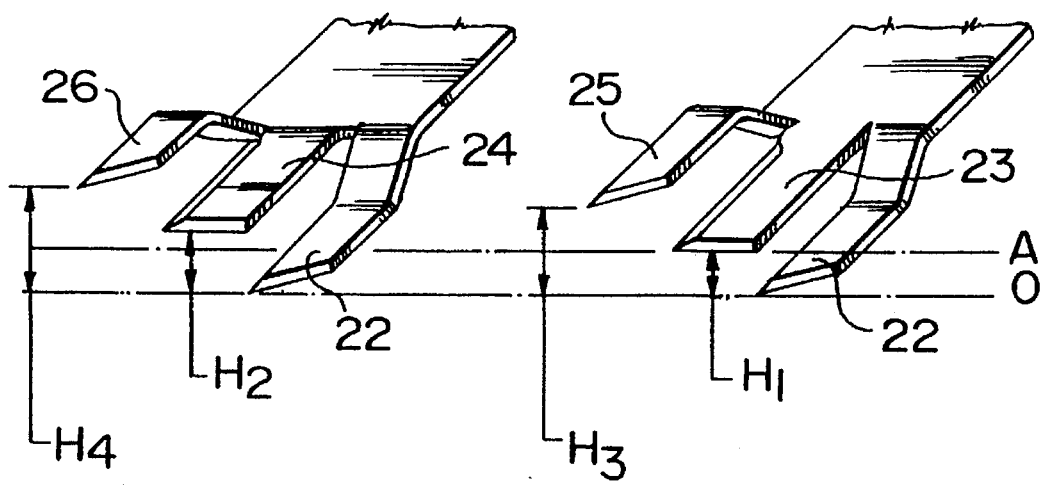
FIG. 3 is an explanatory respective in perspective view of the cutting sequences of the cutting elements according to my novel lawn mower blade.
Figure 4:
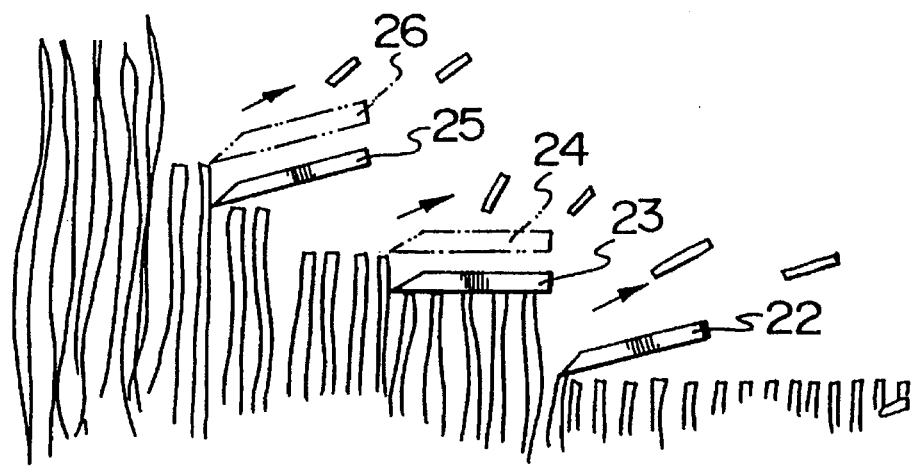
FIG. 4 is a diagrammatic representation of the cutting sequences according to my invention.

According to my invention, and referring now to FIG. 2A, my novel lawn mower blade (20) consists of a central bar portion (21) with opposite distal ends tined into three axially aligned tines, each at a different elevation relative to the plane of the longitudinal central axis (A) of the blade (20). At one end there are three axially disposed tines (22), (24) and (26), and similarly at the other end, tines (22), (23) and (25), each of the tines having a forward bevelled edge which acts as a cutting means and respectively referenced (22'), (23'), (24'), (25') and (26'). For convenience, tine (23) is co-incident with the longitudinal axial plane (A) of the blade and both tines (22), at a given distance beneath that and co-incident to each other, as more clearly seen in FIGS. 7A and 7B and hence, reside on the cutting line (0), shown in FIGS. 3 and 6. The various cutting distances of each of the tines is illustrated in FIG. 3, from the lowest cutting blade tine (22) along a plane (0) and with reference to FIGS. 3 and 4 it clearly illustrates that as the lawn mower blade (20) goes through its clockwise turning cycle during grass cutting, tine (26), engages the grass first, thereafter tine (25), thereafter tine (24), thereafter tine (23) and thereafter, tines (22). Each of the upper tines (26) through (23) cut the grass, as seen in FIG. 4, at a different elevation from the base plane (0) which is cut by the two end tines (22) and which respective tines is the rearmost tine in each tine end set. In this way, the actual length of a cut blade of grass is the distance between the tine, i.e., selectively the distance between ($H_4$) minus ($H_2$) at the distance of the cut between tines (24) and (26); hence, repeatedly, as it relates to all other tines.

If the grass is substantially longer than the distance ($H_4$), the length of grass above ($H_4$) will also tend to be cut by the swirling action between deck and blade, as the blade (20) whirls under the deck to cut the grass.

Figure 1A:
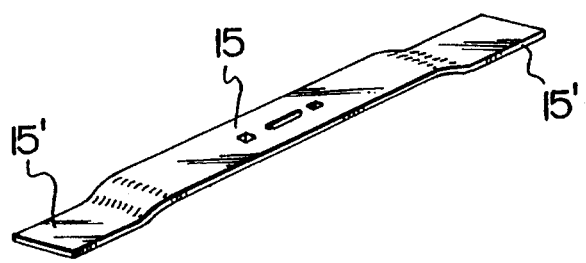

In actual reality, since this blade (20) offers six cutting edges (22') through to and including (26') while the normal rotary blade of the prior art, FIG. 1A, only offers two cutting edges, there is a greater than two-fold increase in the number of cuts over any given area of grass during cutting with the adjunct result that the grass clippings are much shorter.

It has been observed that the amount of spent or cut grass ejected from the spout of the lawn mower, shown in FIG. 2 and employing the novel lawn mower blade, according to my invention, is approximately 5% to 10% of the normal grass cuttings when the prior art mower and blade of FIGS. 1 and 1A is used. Moreover, the resultant grass cuttings, from my novel blade (20), are so small as to not "overcover" cut grass to make it unsightly. In fact, the length of the clippings of each cut segment of a blade of grass is dependent on the height from the base plane (0) of each tine, tines (22) being at the base plane (0), while others are in elevation therefrom, i.e., tines (23) through (26) and organized in a sequential cutting order for their respective cuts. I have found convenient dimensions to use for the distance of (H), according to the following table and with reference to FIG. 3 wherein:

($H_0$)=Base Plane (0) for the cutting edge (22') of the lowest cutting tines (22)

($H_1$)=0.5 inches for cutting edge (23') of the tine (23)

($H_2$)=0.75 inches for cutting edge (24') of the tine (24)

($H_3$)=1 inch for cutting edge (25') of the tine (25)

($H_4$)=1.5 inches for cutting tine (26)

At the same time, each edge (26') of the tine has a depth or width of approximately 1 inch so the total width of the lawn mower blade (20) is approximately 3 inches. The length (see FIG. 6) of each cutting tine (22) through (26) is about 3 inches for a 21 inch long lawn mower blade (20).

Figure 6:
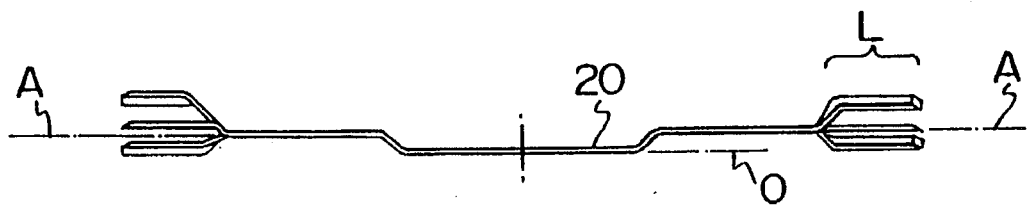
FIG. 6 is a side elevational view of the blade of FIG. 5.

I prefer, for simplicity of manufacturing, that the center portion of the blade referenced (21) be co-incident with the base plane (0), as seen in FIG. 6.

Note that the edge (23') of the trailing tines (22) trail and are coincident with the lowest or base plane elevation (0) at each end so as to be the last cutting blade during each rotation. This ensures a smooth cutting of the grass.

Figure 5:
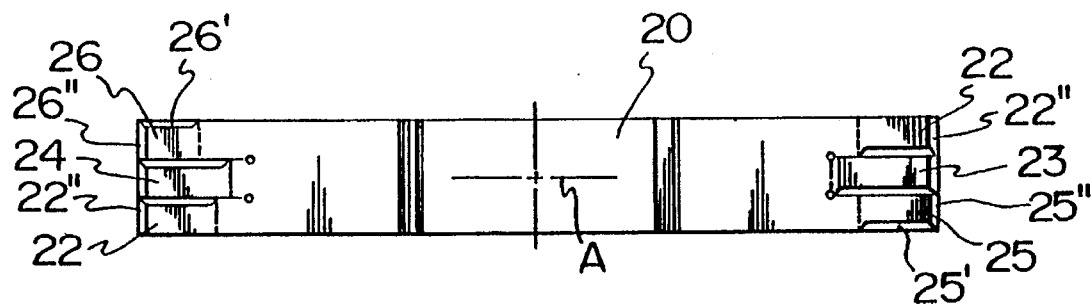
FIG. 5 is a top plan view of my novel blade.

Preferably, and referring to FIG. 5, the actual ends of each tine (22) through (26) should also be bevelled so as to provide an additional cutting element or surface. They are respectively shown in the figures as cutting edges (22"), (25") and (26"), it being noted that tines (23) and (24) are also end bevelled but not referenced.

Experimental observation

I have observed, that a lawn mower blade configured as above described, cuts more efficiently and produces shorter grass clippings from cutting than prior art blade. Additionally, shorter grass clippings result, if the ends of the tines are bevelled as (22"), (25") and (26"), into cutting elements. Further the swath, the dimension between ($H_0$) and ($H_4$), provides a wider band of cutting and in fact, a cylindrical cutting Area=L×($H_4$−$H_0$) provides essentially a pulverization zone for the grass clippings resulting in them being cut very fine. Further this novel blade, when viewed by strobe light eliminates the circumferential collection of grass against the underskirt of the deck of a lawn mower which generally occurs during normal cutting and is accentuated when the grass is damp. In prior art lawn mowers, not using my novel blade, this collection of grass onto the under inner skirt of the deck causes ball-like clumps of cut grass to collect, then to fall periodically during cutting and to be scattered over the lawn; while with my novel blade, as aforesaid described, the accumulation of grass on the under inner surfaces of the deck and deck skirt is virtually eliminated. The sporadic deposition of ball-like clumped cut grass clippings is avoided.

I claim:

1. A lawnmower cutting blade for rotary lawn mower, having a primer mover with a rotary shaft, the blade comprising:

(a) a single integral elongated member being the blade defining means for attachment of the blade to the rotary shaft of the prime mover, the blade defining;

(i) at each opposite end, at least two spatially disposed tines, one time positioned forward of a rearward tine, each tine having a bevelled leading edge that acts as a cutting element against grass to be cut, during rotation by the prime mover, each of the rearmost tines at opposite ends being relatively co-incident and in a lowest elevational plane;

(ii) each forward tine at either end being at different elevational planes above that of the lowest elevational plane.

2. The blade as claimed in claim 1, additionally including:

(iii) a leading tine located at either end of the elongated member positioned lateral to that of the forward tine but at an elevation that is above that of its adjacent forward tine.

3. The blade as claimed in claim 2, wherein the leading tines are respectively at different elevational planes above those of the forward tines.

4. The blade as claimed in claim 3, wherein the tines are respectively placed in planes, at one end the forward and leading tines in an elevational plane different than the corresponding forward and leading tines at the opposite end, with the two forward tines at opposite end in adjacent planes.

5. The blade as claimed in claim 4, wherein the leading tine, at one end, is at an elevation intermediate that of the leading and forward tines at the opposite end.

6. The blade as claimed in claim 4, wherein each tine has an end which is also bevelled to provide each tine with a second end cutting element.

7. The blade as claimed in claim 5, wherein each tine has an end which is also bevelled to provide each tine with a second end cutting element.

\* \* \* \* \*